United States Patent [19]
Szeto et al.

[11] Patent Number: 6,161,199
[45] Date of Patent: *Dec. 12, 2000

[54] NON-INTRUSIVE IN-SYSTEM DEBUGGING FOR A MICROCONTROLLER WITH IN-SYSTEM PROGRAMMING CAPABILITIES USING IN-SYSTEM DEBUGGING CIRCUITRY AND PROGRAM EMBEDDED IN-SYSTEM DEBUGGING COMMANDS

[75] Inventors: Kinyue Szeto, San Francisco; Charles M. Gracey, III, Rocklin; Chuck C. W. Cheng, Saratoga, all of Calif.

[73] Assignee: Scenix Semiconductor, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/989,830

[22] Filed: Dec. 12, 1997

[51] Int. Cl.[7] ..................................................... H02H 3/05
[52] U.S. Cl. .............................. 714/30; 714/38; 711/103; 710/129; 703/28
[58] Field of Search ................... 395/500; 712/220–232; 710/129; 714/30–36, 38; 364/140.09; 711/103; 703/28

[56] References Cited

U.S. PATENT DOCUMENTS

| 4,727,514 | 2/1988 | Bhuva et al. ............................ 365/104 |
| 5,157,781 | 10/1992 | Harwood et al. .......................... 714/30 |
| 5,278,759 | 1/1994 | Berra et al. .................................. 701/1 |
| 5,473,758 | 12/1995 | Allen et al. .............................. 711/103 |
| 5,686,844 | 11/1997 | Hull et al. ................................. 326/38 |
| 5,790,833 | 8/1998 | Gulick et al. ............................. 703/28 |
| 5,841,996 | 11/1998 | Nolan et al. ............................. 710/129 |
| 5,903,718 | 5/1999 | Marik ........................................ 714/38 |

OTHER PUBLICATIONS

Easy Pic'n, A Beginner's Guide to Using PIC 16/17 Microcontrollers; Square 1 Electronics—David Benson, Version 2.0; pp. 1–153.

*Primary Examiner*—John A. Follansbee
*Assistant Examiner*—Nabil El-Hady
*Attorney, Agent, or Firm*—Fenwick & West LLP

[57] ABSTRACT

An in-system debugging (ISD) capability is incorporated into a production microcontroller. The ISD capability is incorporated without the costly addition of any extra pins to read out the data for debugging by using the oscillator pins of the production microcontroller to read out the data. Building such an ISD capability into the microcontroller, enables debugging to be performed on the actual production board (instead of a special debug board) having the actual production microcontroller (instead of a bond-out microcontroller). This allows designers to debug programming using the actual production system instead of an emulation system.

20 Claims, 16 Drawing Sheets

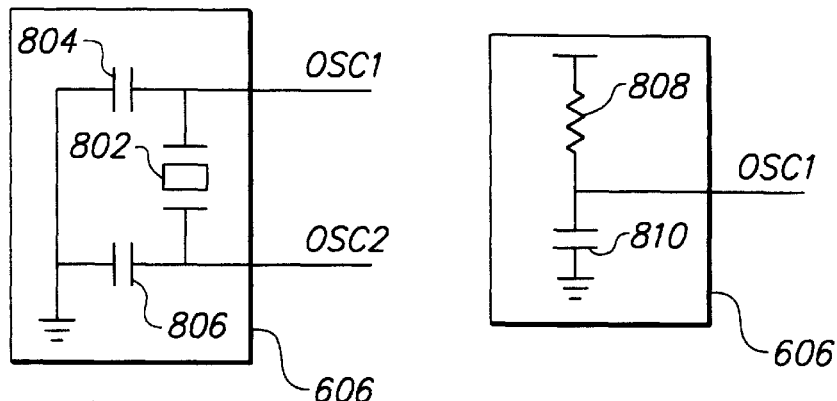
FIG. 8A
(PRIOR ART) XTAL
FIG. 8B
(PRIOR ART) XRC
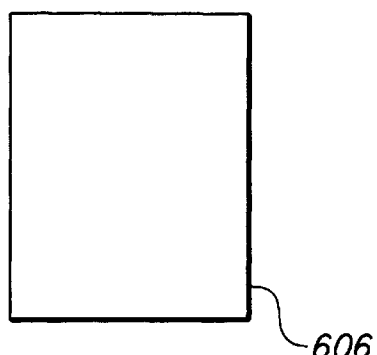
FIG. 8C
(PRIOR ART) IRC
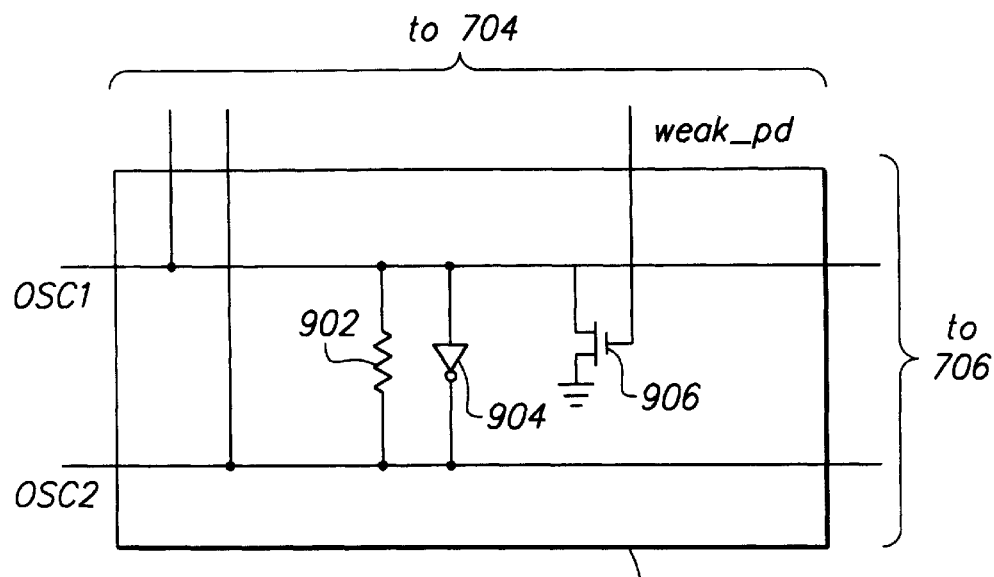
FIG. 9A XTAL

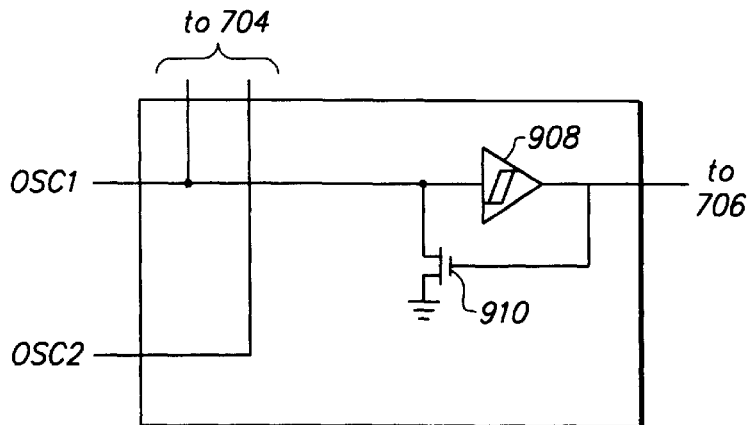
FIG. 9B XRC
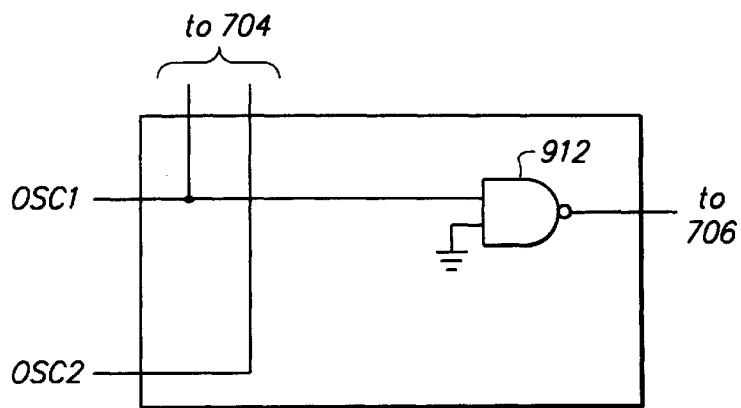
FIG. 9C IRC
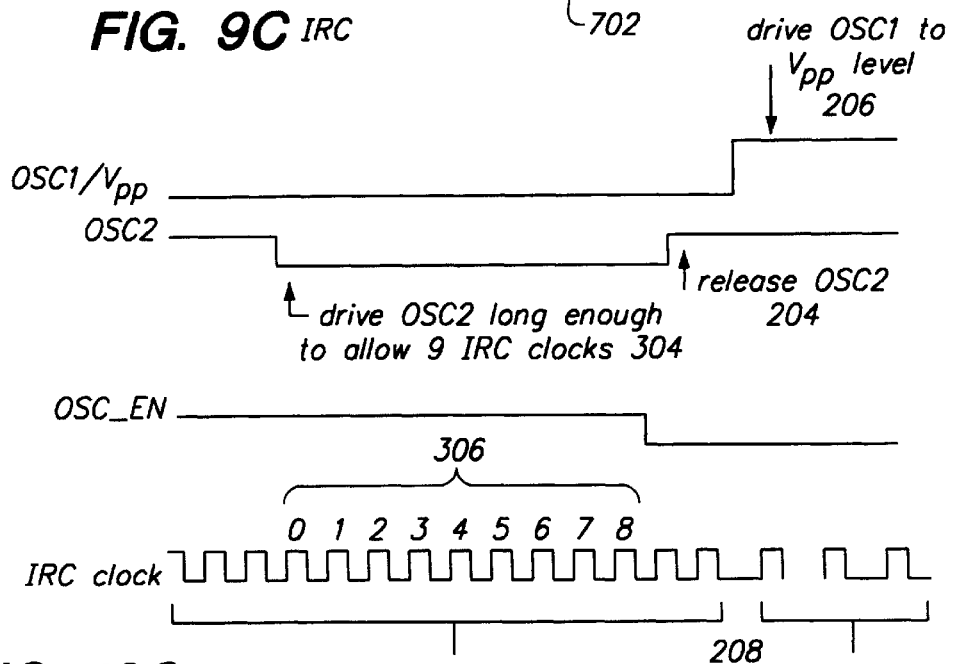
FIG. 10C IRC    4 MHz TO 32 KHz    128 KHz

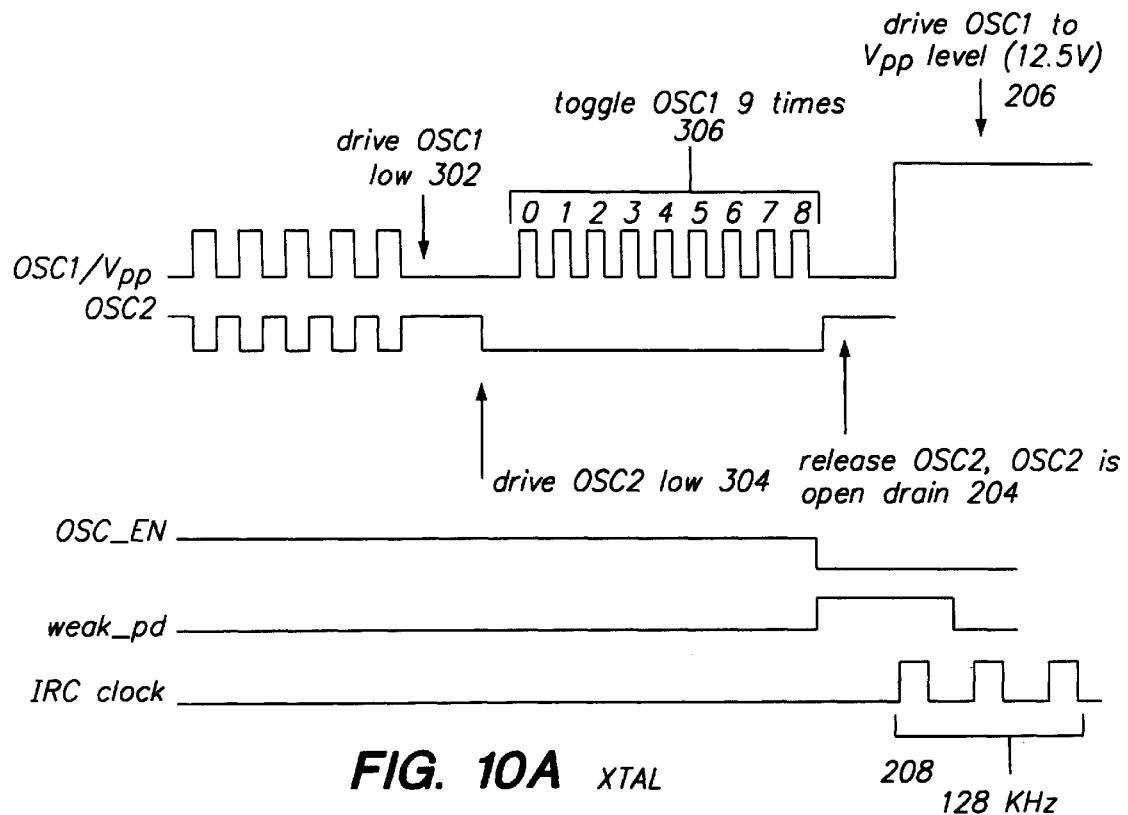
FIG. 10A XTAL
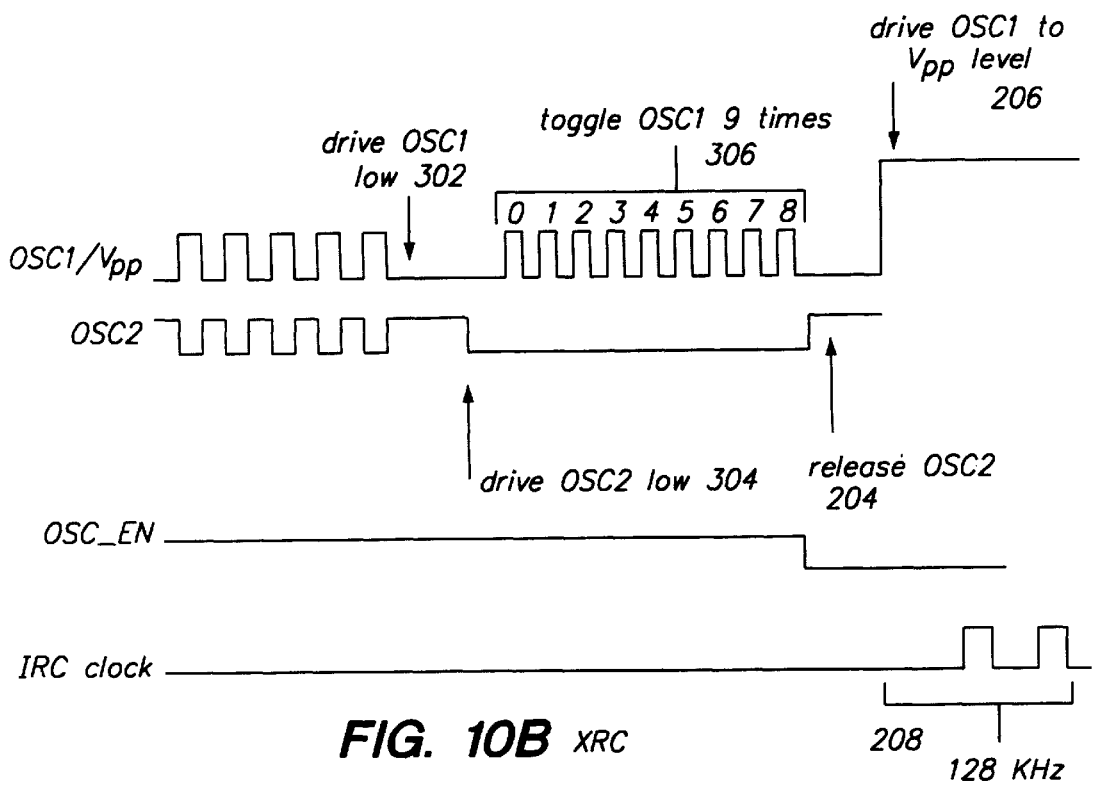
FIG. 10B XRC

ISP Circuitry

Timing for Noise Filter

*New ISD Register:*

DEBUG (Write-only register bits; set to 8'hFF on reset)

| 7 | 6 | 5 | 4 | 3 | 2 | 1 | 0 |
|---|---|---|---|---|---|---|---|
| res | res | res | res | OSC_EN | SS_EN_ | BP_EN | BRK_EN | res       reserved—may be used for factory test
OSC_EN    active high-enable oscillator (low to enable debugging)
SS_EN_     active low-single-step mode enable
BP_EN_     active low-breakpoint enable
BRK_EN_   active low-break on OSC2 negative edge

*New ISD Instructions:*

| Mnemonic. Operands | Description | Cycles (Comp) | Cycles (Turbo) | Opcode | Status Affected | Notes |
|---|---|---|---|---|---|---|
| OPTIONR | Read OPTION into W | 1 | 1 | 0000 0000 0001 | — | |
| DEBUG | Write W into DEBUG register | 1 | 1 | 0000 0100 0100 | — | |
| OSC2RW | Swap C and OSC2 pin (if OSCEN=0) | 1 | 1 | 0000 0100 0101 | C | |
| SETBP | Write MBITS W into BP | 1 | 1 | 0000 0100 0110 | — | |
| FIFO | Push Pop W through FIFO (8 deep) | 1 | 1 | 0000 0100 0111 | | |
| PUSH_d | Push W into W. STATUS.FSR or PC interrupt stack | 1 | 1 | 0000 0100 10dd | — | |
| POP_d | Pop the W.STATUS.FSR or PC interrupt stack into W | 1 | 1 | 0000 0100 11dd | — | |

*FIG. 22*

Example Program to Debug Using ISD

| Address(hex) | Instruction | Mnuemonic |
|---|---|---|
| 000 | movelw | 0 |
| 001 | movelw | 1 |
| 002 | movelw | 2 |
| 003 | movelw | 3 |
| 004 | movelw | 4 |
| 005 | goto | 000 |

User program

| | | |
|---|---|---|
| ... | | |
| 040 | clrf | rtcc |
| 041 | movlw | 81 |
| 042 | option | |
| 043 | mbits=0 | |
| 044 | movlw | c |
| 045 | setbp_ | |
| 046 | movelw | 0 |
| 047 | push | pc |
| 048 | push | status |
| 049 | movelw | fb |
| 04A | debug | |
| 04B | reti | | break point routine

FIG. 23

| | | |
|---|---|---|
| ... | | |
| 600 | movelw | fb |
| 601 | debug | |
| 602 | reti | | debug interrupt service routine

| 7FE | goto | 600 |
|---|---|---|
| 7FF | goto | 040 |

NON-INTRUSIVE IN-SYSTEM DEBUGGING FOR A MICROCONTROLLER WITH IN-SYSTEM PROGRAMMING CAPABILITIES USING IN-SYSTEM DEBUGGING CIRCUITRY AND PROGRAM EMBEDDED IN-SYSTEM DEBUGGING COMMANDS

RELATED APPLICATION

The present application is related to U.S. Pat. No. 6,021,447 entitled "Non-Intrusive In-System Programming Using In-System Programming circuitry Coupled to Oscillation Circuitry for Entering, Exiting, and Programming In-System Programming Responsive to Oscillation Circuitry Signals," issued Feb. 1, 2000, and naming the same inventors as those named for this application.

BACKGROUND OF THE INVENTION

A. Technical Field

The present invention relates to programming memory on a semiconductor chip. More particularly, this invention relates to debugging program instructions in a microcontroller.

B. Related Art

Microcontrollers are used to control a plethora of electronic products, including cellular phones, fax machines, microwave ovens, automobile controls, and so on. The programming embedded into a microcontroller is developed and debugged on various levels using various tools. One such tool is an in-circuit emulation (ICE) system.

An ICE system allows users access to data from within the microcontroller during its operation, data such as the contents of registers and stacks. Knowledge of such data is very useful in the debugging process. Such data may be made available, for example, by way of single-stepping through a program, or by insertion of a break point within the program, or by an external interrupt originating from a user.

In order to implement ICE, a conventional ICE system uses a special "bond-out" version of the microcontroller which is a modified version of the production microcontroller. The bond-out microcontroller is so called because several pads connected to the internal data bus of the microcontroller are wire-bonded out from the silicon chip to several extra external pins.

Such a conventional ICE system has several disadvantages. First, the bond-out version of the microcontroller is sold in relatively low volume, yet it takes substantial resources from the microcontroller company to develop and maintain. Thus, it is not surprising that the bond-out microcontroller is usually rather expensive. Second, the bond-out microcontroller may have substantial differences from the production controller. For example, the bond-out microcontroller may use a different clock speed, forcing the ICE system to run at a different speed than the production system. In that case, the ICE system may be useful mainly for determining and fixing functional bugs only. Third, a special debug board may need to be used in place of the production board. This may be necessary in order to incorporate the bond-out microcontroller and/or interface with the ICE electronics. Some bugs in the production board may not be reproduced in the debug board.

SUMMARY OF THE INVENTION

The present invention is a method and apparatus for debugging which addresses the above described problems.

An in-system debugging (ISD) capability is incorporated into a production microcontroller. The ISD capability is incorporated without the costly addition of any extra pins to read out the data for debugging by using the oscillator pins of the production microcontroller to read out the data. Building such an ISD capability into the microcontroller, enables debugging to be performed on the actual production board (instead of a special debug board) having the actual production microcontroller (instead of a bond-out microcontroller). This allows designers to debug programming using the actual production system instead of an emulation system.

BRIEF DESCRIPTION OF THE DRAWINGS

FIGS. 8A, 8B, and 8C are circuit diagrams of conventional external oscillation circuits.

FIGS. 9A, 9B, and 9C are circuit diagrams of oscillator interface circuits in a microcontroller according to a preferred embodiment of the present invention.

FIGS. 10A, 10B, and 10C are timing diagrams of signals relating to the method for entering in-system programming mode according to a preferred embodiment of the present invention.

FIG. 22 gives datasheet descriptions of a new ISD register in the microcontroller and new ISD instructions for the microcontroller according to a preferred embodiment of the present invention.

FIG. 23 is a listing of an example program including debug capabilities according to a preferred embodiment of the present invention.

DETAILED DESCRIPTION OF THE PREFERRED EMBODIMENTS

Figure 1:
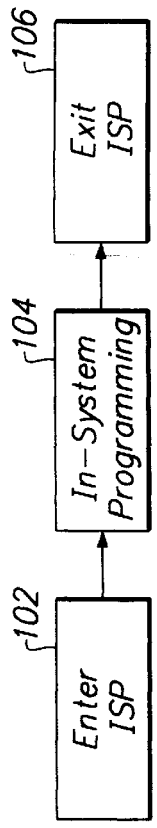
FIG. 1 is a flow diagram showing conventional steps in a general process for in-system programming.

FIG. 1 is a flow diagram showing conventional steps in a general process for in-system programming. The general process includes entering in-system programming mode 102, performing in-system programming 104, and exiting in-system programming mode 106.

Figure 2:
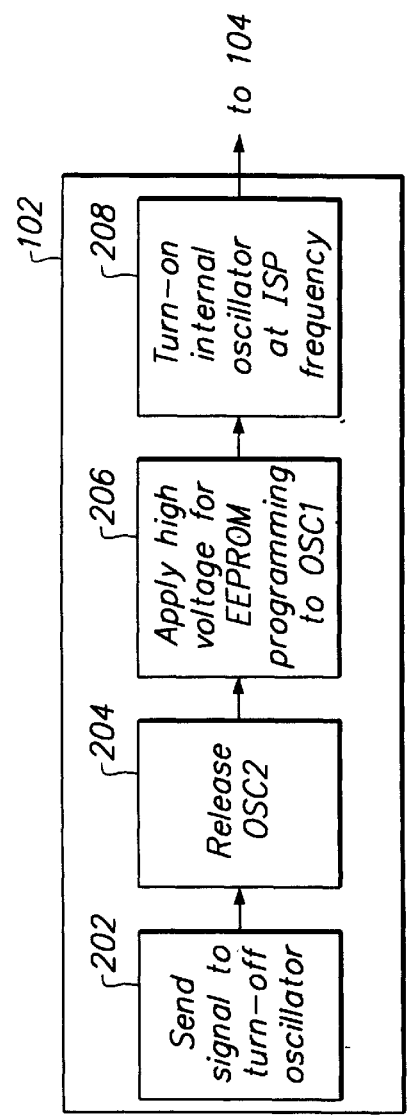
FIG. 2 is a flow diagram showing a method for entering in-system programming mode according to a preferred embodiment of the present invention.

FIG. 2 is a flow diagram showing a method 102 for entering in-system programming mode according to a preferred embodiment of the present invention. The method 102 includes a first step 202 of sending a signal to turn-off an oscillator for the device to be programmed, a second step 204 of releasing a voltage on a second oscillator pin (OSC2), a third step 206 of applying a relatively high voltage to a first oscillator pin (OSC1) to enable EEPROM programming, and a fourth step 208 of turning-on an oscillator internal to the device to be programmed at a frequency corresponding to in-system programming cycles.

Figure 3:
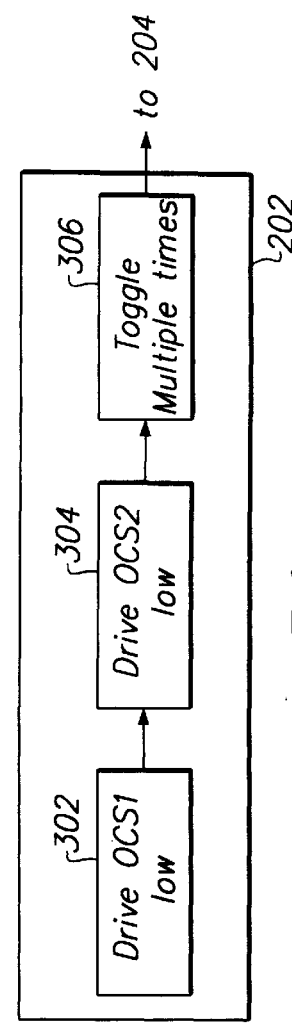
FIG. 3 is a flow diagram showing a method for sending a signal to turn-off an oscillator according to a preferred embodiment of the present invention.

FIG. 3 is a flow diagram showing a method 202 for sending a signal to turn-off an oscillator according to a preferred embodiment of the present invention. The method 202 includes a first step 302 of driving a voltage on the first oscillator pin (OSC1) low, a second step 304 of driving a voltage on the second oscillator pin (OSC2) low, and a third step 306 of toggling a voltage between low and high multiple times.

Figure 4:
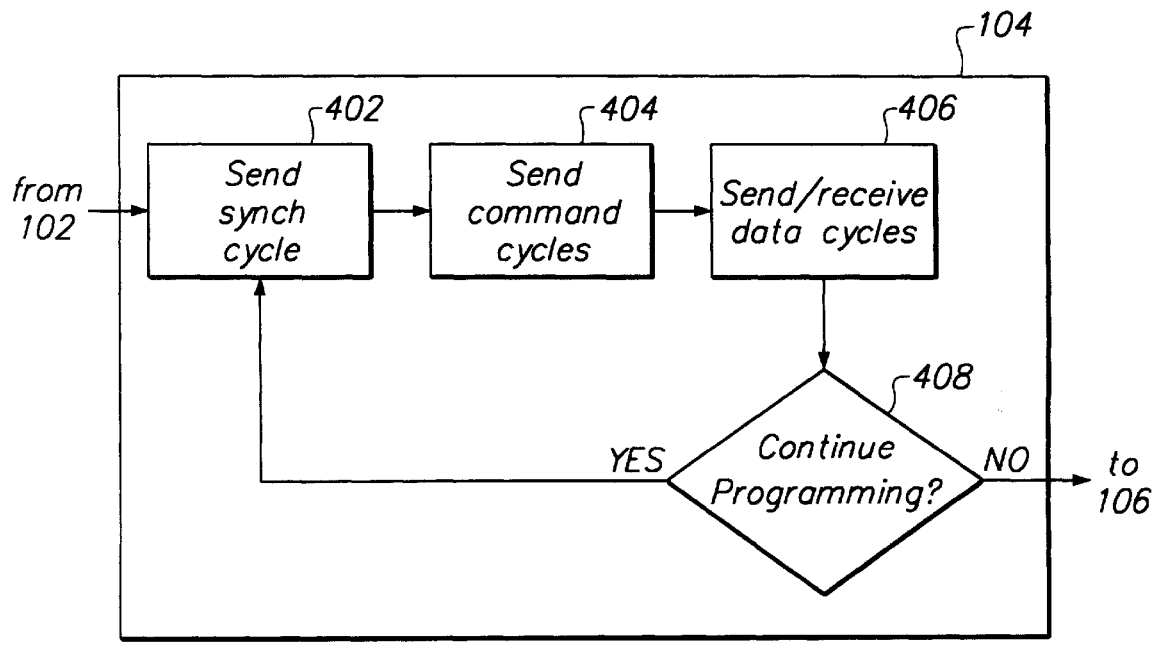
FIG. 4 is a flow diagram showing a method for performing in-system programming according to a preferred embodiment of the present invention.

FIG. 4 is a flow diagram showing a method 104 for performing in-system programming according to a preferred embodiment of the present invention. The method 104 includes: a first step 402 of sending a synchronization cycle from the programming device to the device to be programmed; a second step 404 of sending multiple command cycles from the programming device to the device to be programmed; a third step 406 of either sending multiple data cycles from the programming device to the device to be programmed, or receiving multiple data cycles by the programming device from the device to be programmed; and a fourth step 408 of determining whether or not to continue programming. If it is determined in the fourth step 408 that programming is to be continued, then the method 104 loops back to perform the first step 402. Otherwise, if programming is not to be continued, then the method 104 terminates and in-system programming mode is then exited 106.

Figure 5:
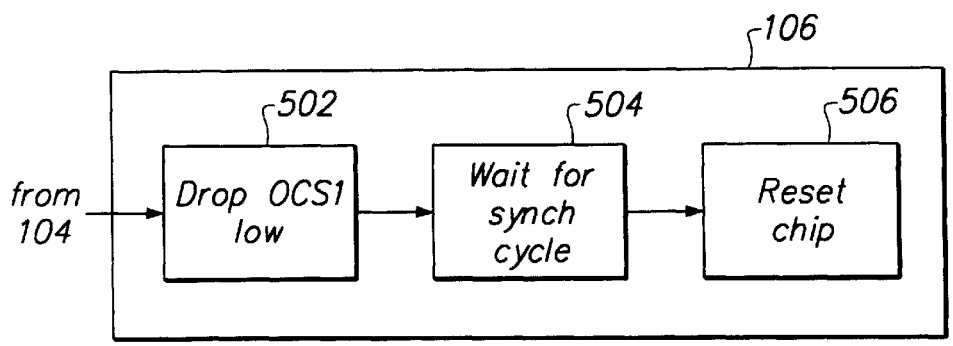
FIG. 5 is a flow diagram showing a method for exiting in-system programming mode according to a preferred embodiment of the present invention.

FIG. 5 is a flow diagram showing a method 106 for exiting in-system programming mode according to a preferred embodiment of the present invention. The method 106 includes a first step 502 of driving a voltage on the first oscillator pin (OSC1) low, a second step 504 of waiting for a synchronization cycle to be sent from the programming device to the device to be programmed, and a third step 506 of resetting the device to be programmed and thus ending in-system programming mode.

Figure 6:
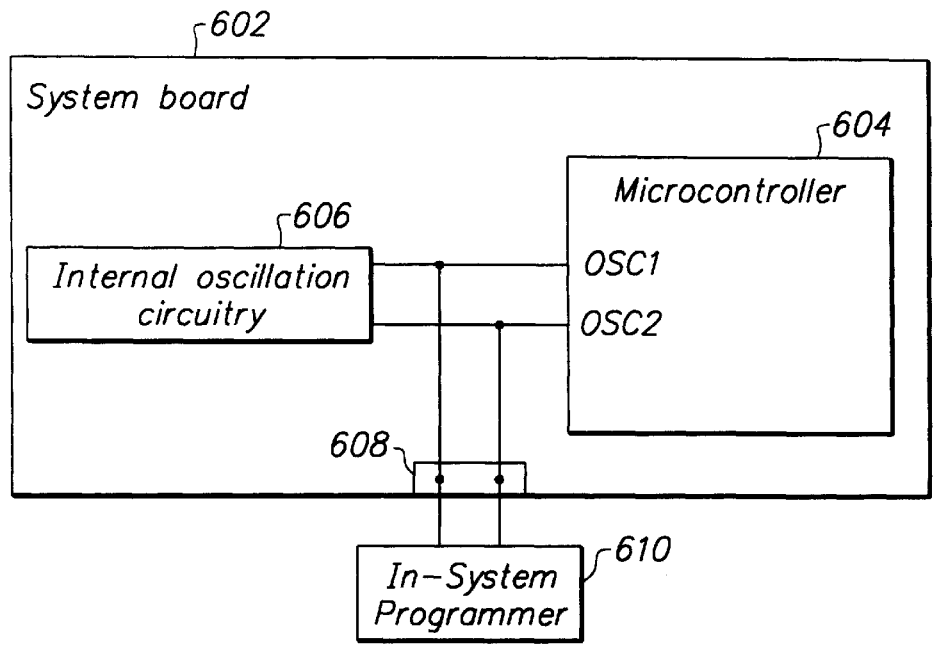
FIG. 6 is a diagram of a system for in-system programming of a microcontroller according to a preferred embodiment of the present invention.

FIG. 6 is a diagram of a system for in-system programming of a microcontroller according to a preferred embodiment of the present invention. The system includes a system board 602 and an in-system programmer machine 610. The system board 602 comprises a microcontroller 604, external oscillation circuitry 606, and a connector 608. The microcontroller 604 includes two oscillator pins (OSC1 and OSC2) which couple to the external oscillation circuitry 606 and to the connector 608. The connector 608 is further coupled to the in-system programmer 610.

Figure 7:
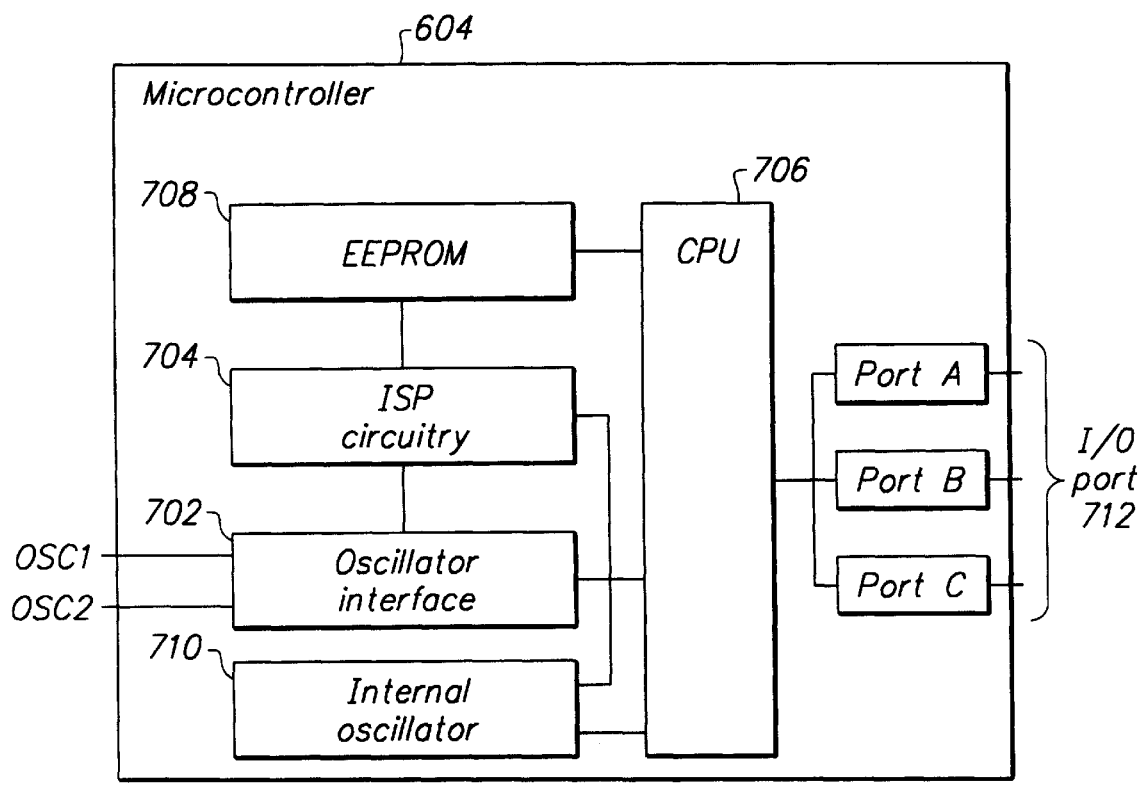
FIG. 7 is a block diagram of a microcontroller according to a preferred embodiment of the present invention.

FIG. 7 is a block diagram of a microcontroller 604 according to a preferred embodiment of the present invention. The microcontroller 604 includes two oscillator pins (OSC1 and OSC2), an oscillator interface circuitry 702, in-system programming (ISP) circuitry 704, a central processing unit (CPU) 706, an electrically erasable programmable read-only memory (EEPROM) 708, internal oscillator circuitry 710, and input/output (I/O) ports 712. OSC1 and OSC2 are coupled to the oscillator interface circuitry 702. The oscillator interface circuitry 702 is further coupled to the ISP circuitry 704 and the CPU 706. The ISP circuitry 704 is further coupled to the EEPROM 708 and the internal oscillator circuitry 710. The CPU 706 is further coupled to the EEPROM 708, to the internal oscillator circuitry 710, and to the I/O ports 712 (which interface with circuitry outside the microcontroller 604 via I/O pins). In contrast to the present invention, conventional systems couple their in-system programming circuitry to their input/output ports.

FIGS. 8A, 8B, and 8C are circuit diagrams of conventional external oscillation circuits 606. FIG. 8A is a circuit diagram of a conventional crystal oscillator circuit. The crystal oscillator (XTAL) circuit includes a crystal 802 coupled between OSC1 and OSC2, a first capacitor 804 coupled between OSC1 and electrical ground, and a second capacitor 806 coupled between OSC2 and electrical ground.

FIG. 8B is a circuit diagram of a conventional external RC oscillator (XRC) circuit. The external RC oscillator circuit includes a resistor 808 coupled between OSC1 and a power supply and a capacitor 810 coupled between OSC1 and electrical ground.

FIG. 8C shows that where an internal RC oscillator (IRC) circuit (i.e. one internal to the microcontroller chip) is used, no external oscillation circuit 606 is necessary.

FIGS. 9A, 9B, and 9C are circuit diagrams of oscillator interface circuitry 702 in a microcontroller 604 according to a preferred embodiment of the present invention. FIG. 9A is a circuit diagram of a first oscillator interface circuit for interfacing with a crystal oscillator circuit (XTAL). The first interface circuit includes: a resistor 902 coupled between OSC1 and OSC2; an inverter 904 coupled between OSC1 and OSC2; a (NMOS) transistor with its source coupled to OSC1, its drain coupled to ground, and its gate coupled to a line for carrying a weak pull-down (weak_pd) signal from the ISP circuitry 704. The first oscillator interface circuit also couples OSC1 and OSC2 to the ISP circuitry 704 and the CPU 706.

FIG. 9B is a circuit diagram of a second oscillator interface circuit for interfacing with an external RC oscillator circuit (XRC). The second interface circuit includes: a Schmitt trigger 908 with its input coupled to OSC1 and its output coupled to the CPU 706; and a (NMOS) transistor 910 with its source coupled to OSC1, its drain coupled to ground, and its gate coupled to the output of the trigger 908. In addition, the second interface circuit couples OSC1 and OSC2 to the ISP circuitry 704.

FIG. 9C is a circuit diagram of a third oscillator interface circuit for the case when an internal RC oscillator (IRC)

circuit is used. The third interface circuit includes a NAND gate 912 with a first input coupled to OSC1, a second input coupled to ground, and an output coupled to the CPU 706. Because the second input is ground, the NAND gate 912 outputs high (logical 1) regardless of the first input. This is to prevent the output coupled to the CPU 706 from floating. The third interface circuit also couples OSC1 and OSC2 to the ISP circuitry 704.

Note that a single microprocessor 604 can implement all of the above three interface circuits 702 and use logic to activate the appropriate interface circuit depending on the external oscillator circuitry 606 chosen or being used. Implementing such logic is within the capabilities of one of ordinary skill in the pertinent art.

FIGS. 10A, 10B, and 10C are timing diagrams of signals relating to the method for entering 102 in-system programming mode according to a preferred embodiment of the present invention. The timing diagram of FIG. 10A relates to the case where a crystal oscillator (XTAL) is being used. The in-system programmer 610 first sends 202 a signal to the microprocessor 604 to turn-off the crystal oscillator. The signal is sent 202 in three steps. In the first step 302, the programmer 610 interrupts the normal oscillation on OSC1 and OSC2 by driving and holding the voltage on OSC1 low. Since OSC2 is coupled to OSC1 via an inverter 904, when OSC1 is driven low, OSC2 goes high. In the second step 304, the programmer 610 drives the voltage on OSC2 low also, such that both OSC1 and OSC2 is low. This is an unusual condition given the inverter 904 between OSC1 and OSC2. In the third step 306, the programmer toggles the voltage on OSC1 a plurality of times. More specifically, OSC1 goes from low to high and back to low nine (9) times. The ninth low-to-high transition (i.e. rising edge) of the voltage on OSC1 signals the microcontroller 604 to turn off its circuitry driving OSC1 and OSC2. Thereafter, the programmer 610 releases 204 the voltage on OSC2 such that OSC2 is open drain, and then drives 206 the voltage on OSC1 to a rather high level (Vpp which is typically about 12.5 volts) to enable EEPROM programming. Finally, the microprocessor 604 turns-on 208 an internal oscillator 710 at a frequency (e.g., 128 KHz) for in-system programming.

The timing diagram of FIG. 10B relates to the case where an external RC oscillator (XRC) is being used. The in-system programmer 610 first sends 202 a signal to the microprocessor 604 to turn-off the external oscillator. The signal is sent 202 in three steps. In the first step 302, the programmer 610 interrupts the normal oscillation on OSC1 and OSC2 by driving and holding the voltage on OSC1 low. In the second step 304, the programmer 610 drives the voltage on OSC2 low also, such that both OSC1 and OSC2 is low. In the third step 306, the programmer toggles the voltage on OSC1 a plurality of times. More specifically, OSC1 goes from low to high and back to low nine (9) times. The ninth low-to-high transition (i.e. rising edge) of the voltage on OSC1 signals the microcontroller 604 to turn off its circuitry driving OSC1 and OSC2. Thereafter, the programmer 610 releases 204 the voltage on OSC2 such that OSC2 is open drain, and then drives 206 the voltage on OSC1 to a rather high level (Vpp which is typically about 12.5 volts) to enable EEPROM programming. Finally, the microprocessor 604 turns-on 208 an internal oscillator 710 at a frequency (e.g., 128 KHz) for in-system programming Note that, as shown in FIG. 10B, the internal oscillator 710 may be turned on 208 after the ninth rising edge but before OSC1 is driven to Vpp.

The timing diagram of FIG. 10C relates to the case where an internal RC oscillator (IRC) is being used. The in-system programmer 610 first sends 202 a signal to the microprocessor 604 to turn-off the normal oscillation of the internal oscillator 710. The signal is sent 202 in two steps. In the first step 304, the programmer 610 drives the voltage on OSC2 low also, such that both OSC1 and OSC2 is low (OSC1 begins low for the IRC case). In the second step 306, the normal oscillation is allowed to toggle its voltage a plurality of times. More specifically, the normal oscillation goes from low to high and back to low nine (9) times. The ninth low-to-high transition (i.e. rising edge) signals the microcontroller 604 to turn off the normal oscillation of the internal oscillator 710. Thereafter, the programmer 610 releases 204 the voltage on OSC2 such that OSC2 is open drain, and then drives 206 the voltage on OSC1 to a rather high level (Vpp which is typically about 12.5 volts) to enable EEPROM programming. Finally, the microprocessor 604 turns-on 208 the internal oscillator 710 at a frequency (e.g., 128 KHz) for in-system programming.

Figure 11:
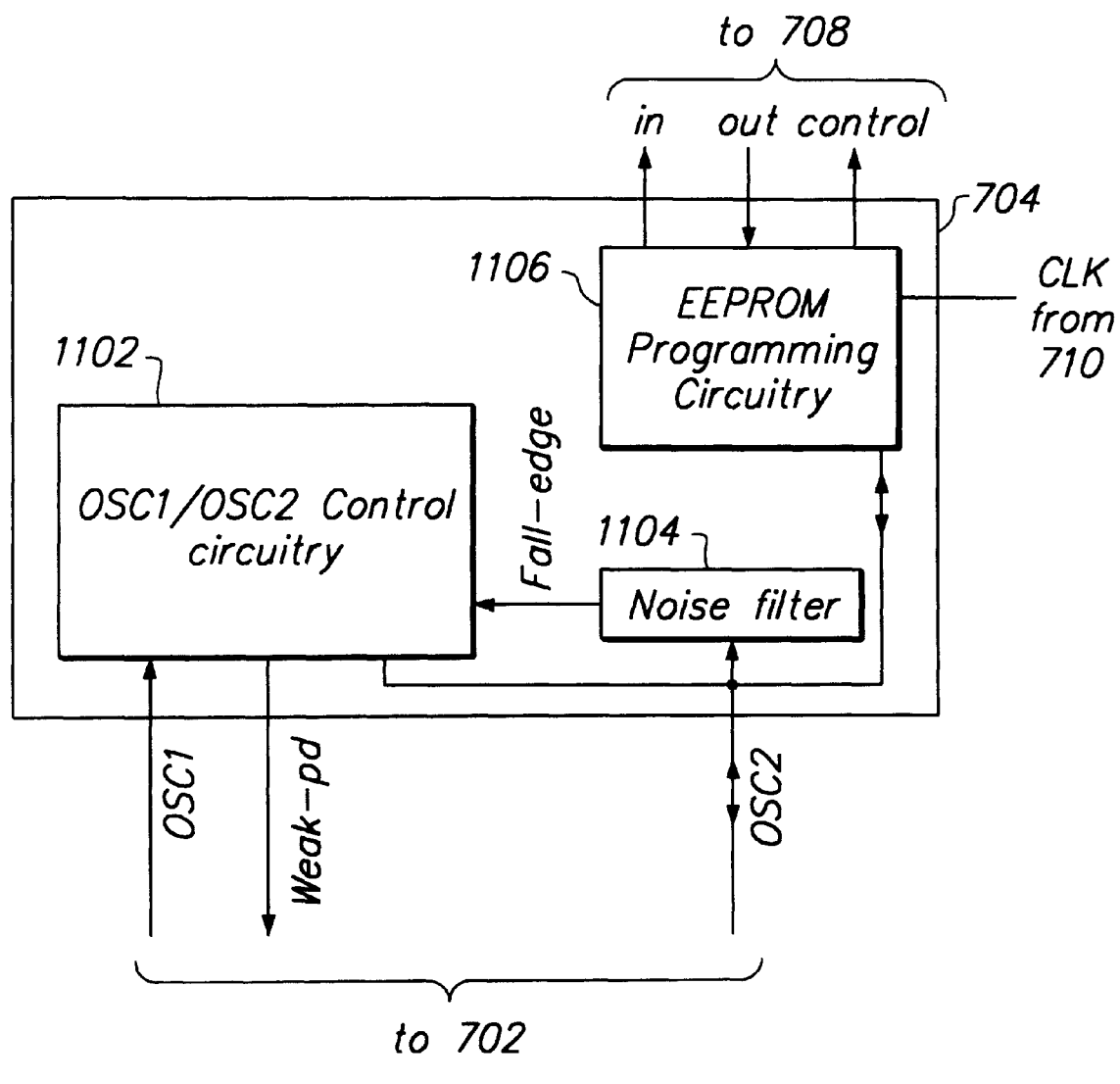
FIG. 11 is a block diagram of in-system programming circuitry in a microcontroller according to a preferred embodiment of the present invention.

FIG. 11 is a block diagram of in-system programming (ISP) circuitry 704 in a microcontroller 604 according to a preferred embodiment of the present invention. The ISP circuitry 704 includes OSC1/OSC2 control circuitry 1102, a noise filter 1104, and EEPROM programming circuitry 1106. The OSC1/OSC2 control circuitry 1102 is coupled to OSC1 and OSC2 (via the oscillator interface circuitry 702) and is also coupled to send the weak pull-down (weak_pd) signal to the interface circuitry 702. The noise filter 1104 is also coupled to OSC2 (via the interface circuitry 702) and is coupled to send a fall_edge signal to the OSC1/OSC2 control circuitry 1102. The EEPROM programming circuitry 1106 is also coupled to OSC2 (via the interface circuitry 702) and is further coupled to the EEPROM circuitry 708. In particular, programming circuitry 1106 is coupled to send data to EEPROM IN of EEPROM circuitry 708, to receive data from EEPROM OUT of EEPROM circuitry 708, and to send commands via EEPROM CONTROL of EEPROM circuitry 708.

Figure 12:
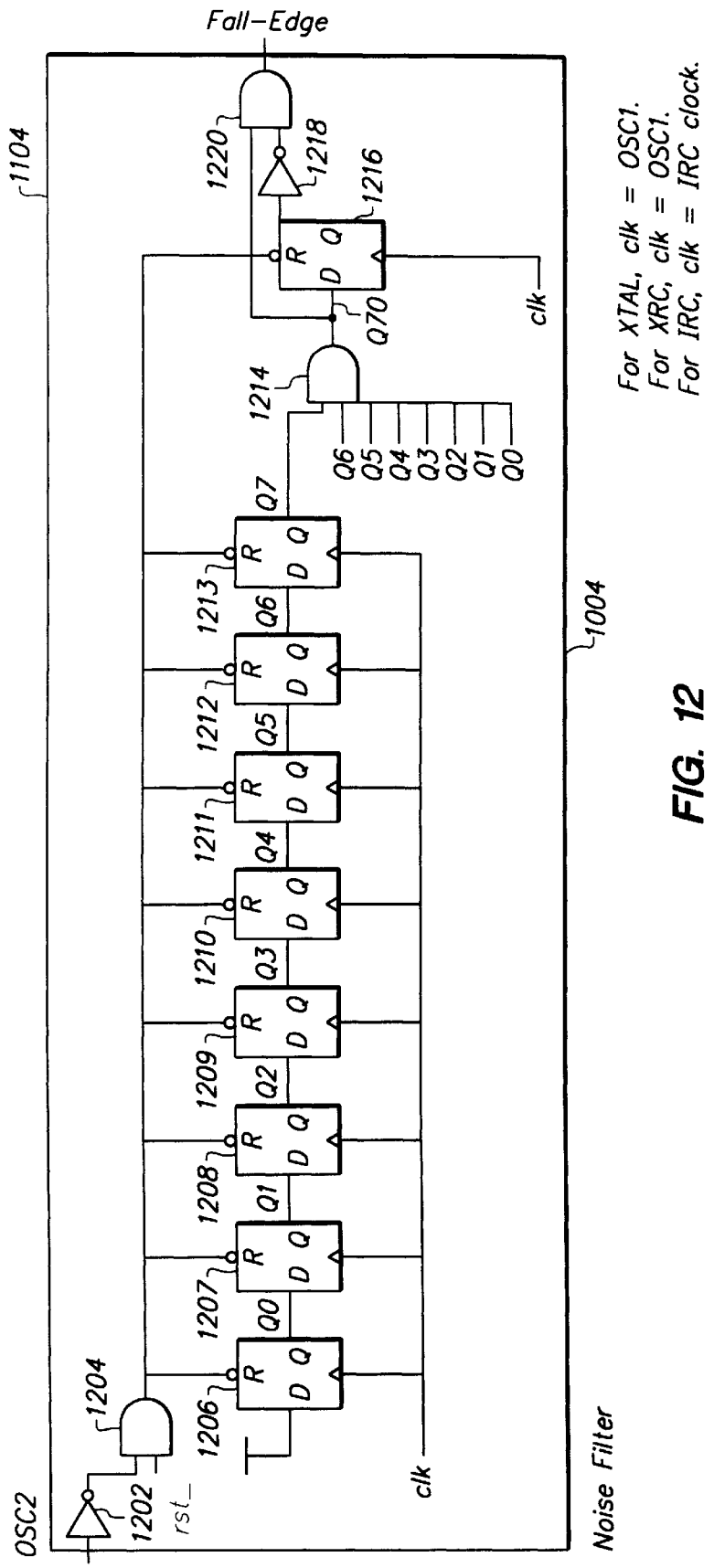
FIG. 12 is a circuit diagram of a noise filter in a microcontroller according to a preferred embodiment of the present invention.

FIG. 12 is a circuit diagram of a noise filter 1104 in a microcontroller according to a preferred embodiment of the present invention. The noise filter 1104 includes a first inverter 1202, a first AND gate 1204, a series of eight (8) D flip-flops 1206–1213, a second AND gate 1214, a ninth D flip-flop 1216, a second inverter 1218, and a third AND gate 1220.

The first inverter 1202 has its input coupled to OSC2 and its output coupled to a first input of the first AND gate 1204. A second input of the first AND gate is coupled to receive a reset signal (rst_). (During normal operation of the microcontroller 604, rst_is high. The voltage of rst_ becomes low when the microcontroller 604 is reset. When rst_is low, the noise filter 1104 is effectively disabled since the output of the first AND gate 1204 is then low regardless of the output of the first inverter 1202.)

The output of the first AND gate 1204 is coupled to the R (reset) input of the eight flip-flops 1206–1213 and to the R input of the ninth flip-flop 1216. Those nine flip-flops 1206–1213 and 1216 are also coupled to receive a clock signal (clk). For the XTAL and XRC cases, the clock signal is the signal on OSC1. For the IRC case, the clock signal is the IRC clock signal. The first flip-flop 1206 has its input (D) coupled to receive a power supply (high). The second through seventh flip-flops 1207–1212 each has its input (D) coupled to receive the output (Q0–Q6, respectively) of the immediately prior sequential flip-flop (1206–1211, respectively). In addition, first through eighth flip-flops (1206–1213) each has its output (Q0–Q7, respectively) coupled to one of eight inputs to the second AND gate 1214.

The second AND gate 1216 has its output (Q70) coupled to the input (D) of the ninth flip-flop 1216 and to a first input of the third AND gate 1220. The ninth flip-flop 1216 has its output (Q) coupled to an input of the second inverter 1218. The second inverter 1218 has its output coupled to a second input of the third AND gate 1220. The third AND gate 1220 outputs a signal designated fall_edge. The fall_edge signal indicates to the OSC1/OSC2 control circuitry (1102) that a signal has been sent 202 to turn-off the normal clock.

Figure 13:
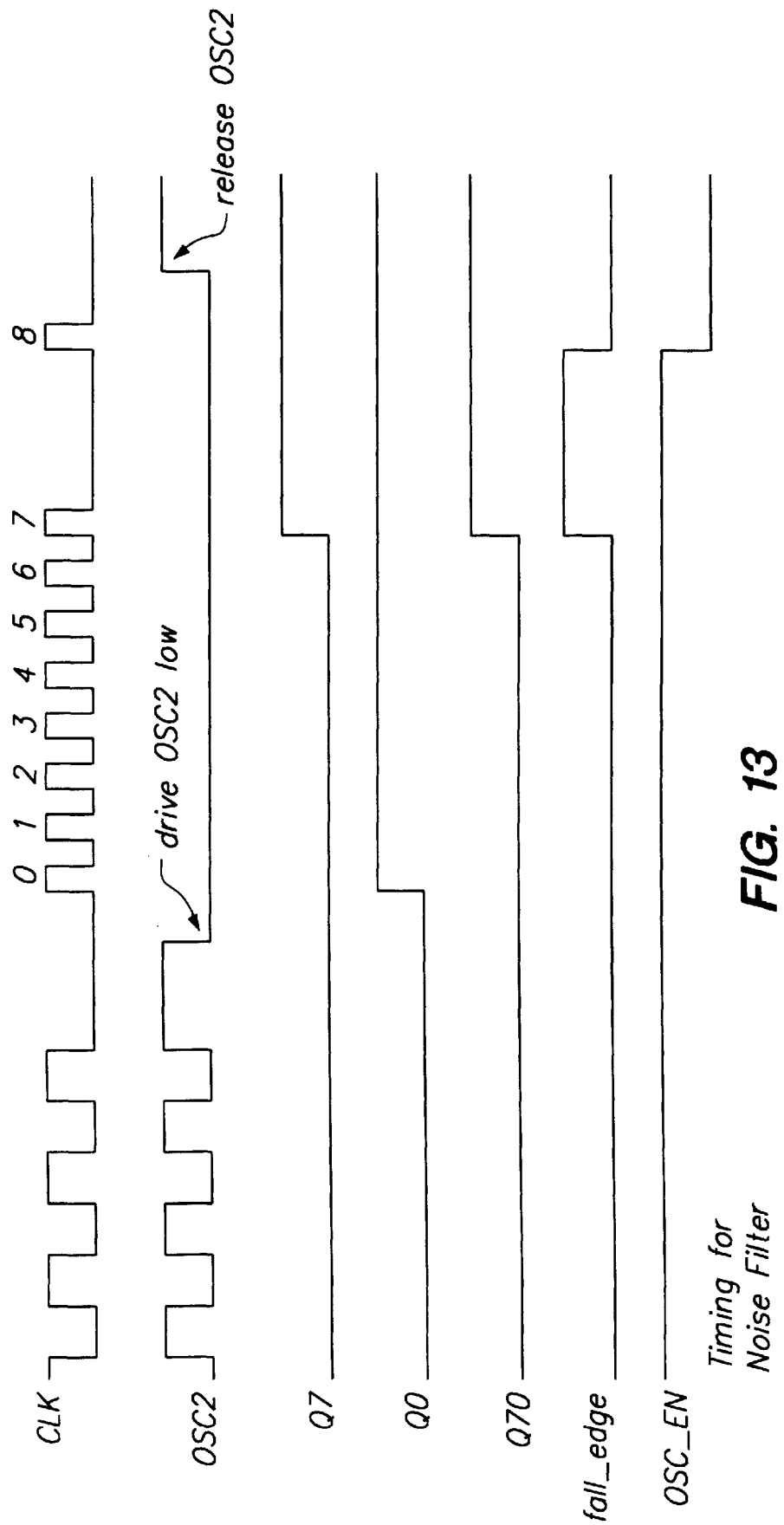
FIG. 13 is a timing diagram of signals in the noise filter according to a preferred embodiment of the present invention.

FIG. 13 is a timing diagram of signals in the noise filter according to a preferred embodiment of the present invention. The CLK signal corresponds to the signal on OSC1 for the XTAL and XRC cases, and the IRC clock signal for the IRC case. The output of the noise filter is the fall_edge signal. The OSC1/OSC2 control circuitry receives the fall_edge signal and causes an oscillator enable (OSC_EN) signal to transition from high to low.

Referring back to FIGS. 10A–C, the falling edge of the OSC_EN signal triggers the OSC1/OSC2 control circuitry 1102 to release 204 the voltage on OSC2 and subsequently to drive 206 OSC1 to Vpp and cause the internal oscillator 710 to generate 208 a clock at the programming frequency (e.g., 128 KHz). In addition, for the XTAL case, the falling edge of the OSC_EN signal triggers the weak_pd signal to go high, which temporarily pulls down the voltage on OSC1 before the voltage on OSC1 is driven to Vpp.

Figure 14:
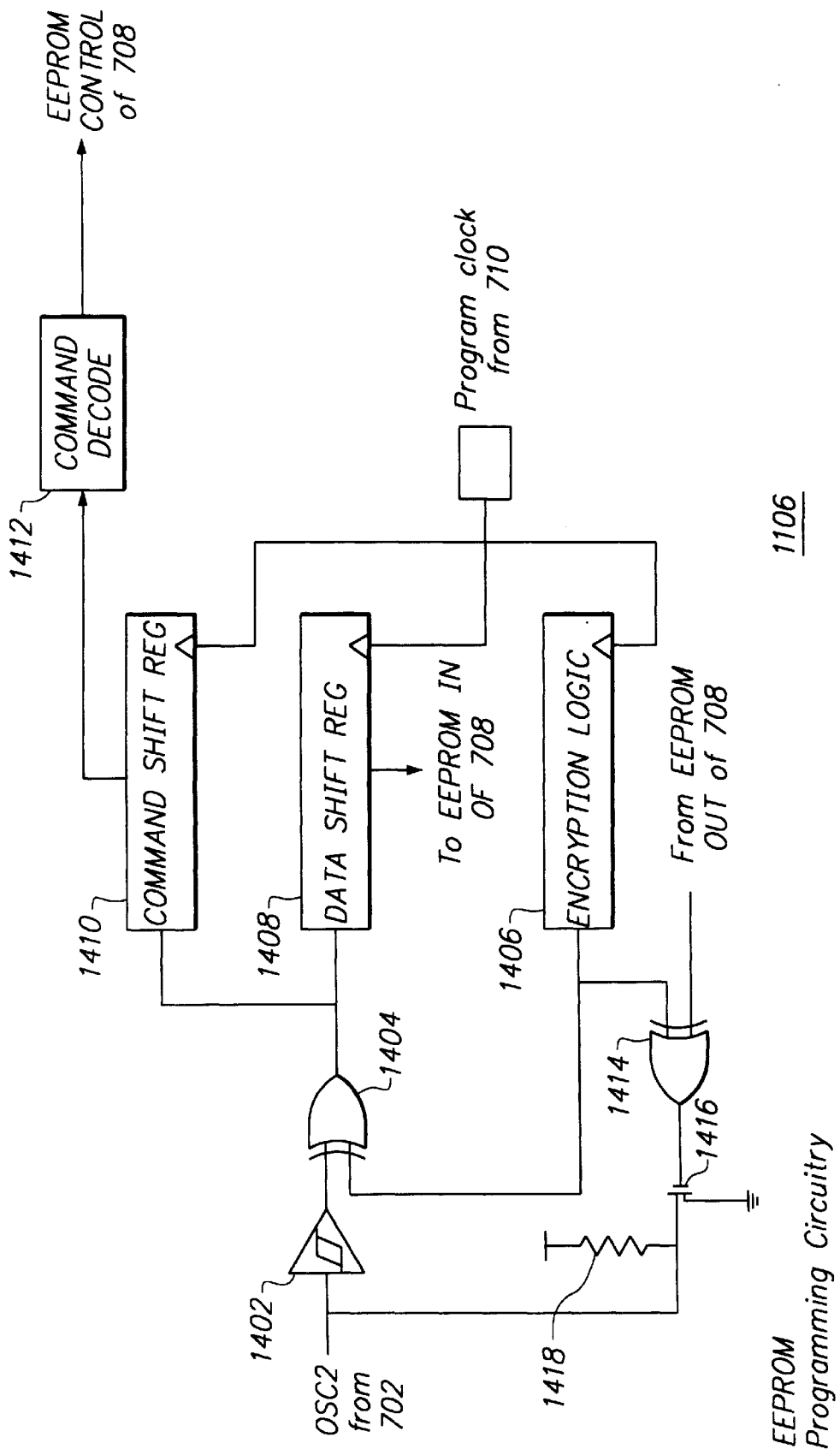
FIG. 14 is a diagram of EEPROM programming circuitry in a microcontroller according to a preferred embodiment of the present invention.

FIG. 14 is a diagram of EEPROM programming circuitry 1106 in the microcontroller 604 according to a preferred embodiment of the present invention. The programming circuitry 1106 includes a trigger 1402, a first XOR gate 1404, encryption logic 1406, a data shift register 1408, a command shift register 1410, a command decode circuit 1412, a second XOR gate 1414, a transistor 1416, and a resistor 1418. The input of the trigger 1402 has its input coupled to receive the signal on OSC2 and its output coupled to a first input of the first XOR gate 1404. The first XOR gate 1404 has a second input coupled to receive an output from encryption logic 1406 and its output coupled to an input of a data shift register 1408 and an input of a command shift register 1410. The encryption logic 1406, the data shift register 1408, and the command shift register 1410 are each coupled to receive a program clock from the internal oscillator 710. The program clock may be, for example, at 128 KHz. The data shift register 1408 has its output coupled to the EEPROM IN input of the EEPROM circuitry 708. The command shift register 1410 has its output coupled to an input of the command decode circuit 1412. The command decode circuit 1412 has its output coupled to the EEPROM CONTROL input of the EEPROM circuitry 708. The encryption logic has its output further coupled to a first input of the second XOR gate 1414. The second XOR gate has another input coupled to receive data signals from the EEPROM OUT output of the EEPROM circuitry 708. The second XOR gate has its output coupled to a gate of the transistor 1416. The transistor 1416 has its source coupled to OSC2 and its drain coupled to ground. The resistor 1418 is coupled between a power supply and OSC2.

Figure 15:
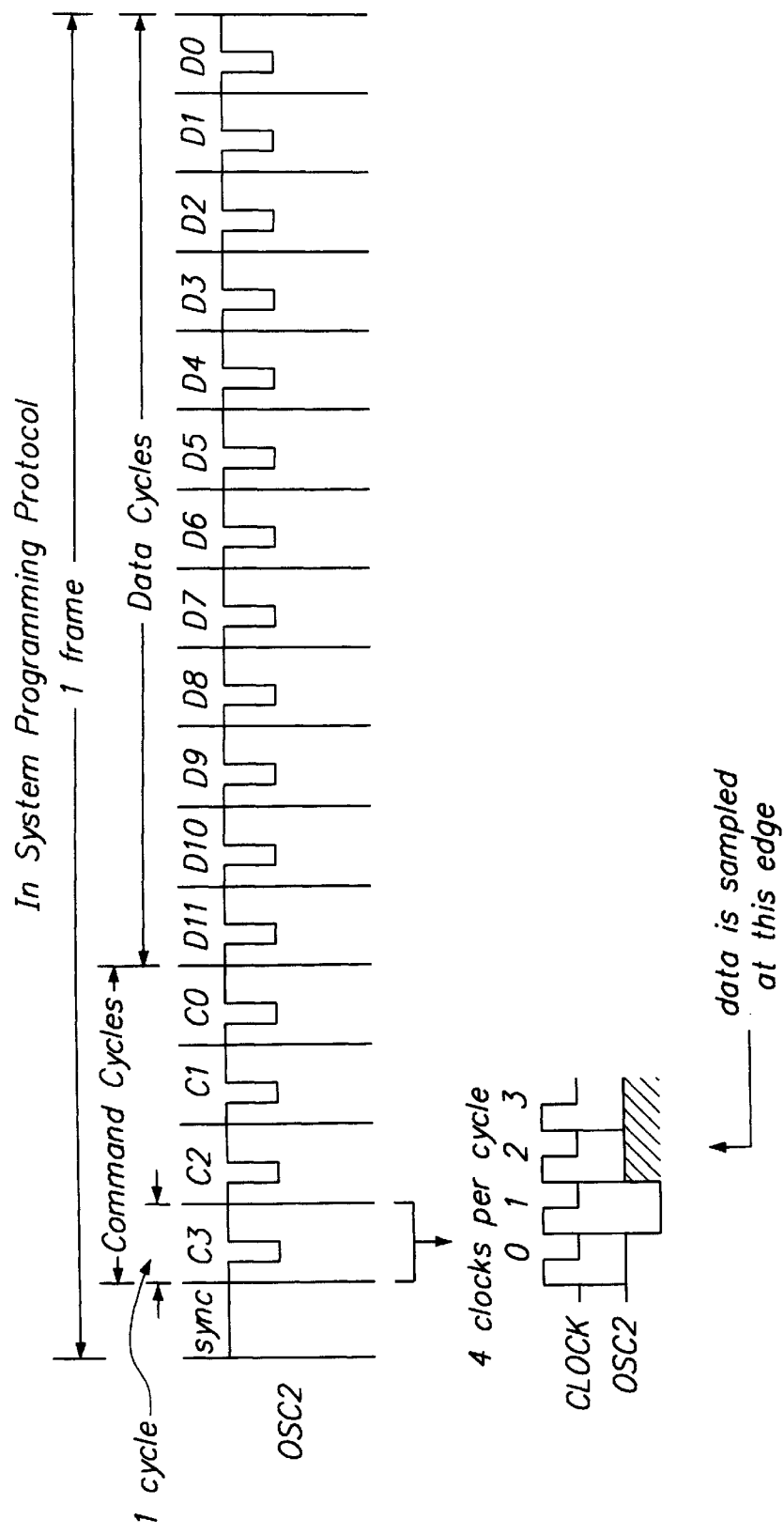
FIG. 15 is a timing diagram of the in-system programming protocol according to a preferred embodiment of the present invention.

FIG. 15 is a timing diagram of the in-system programming protocol according to a preferred embodiment of the present invention. The protocol includes frames. In a preferred embodiment, each frame includes a synchronization (sync) cycle, four command cycles (so there can be up to 16 different ISP commands), and twelve data cycles (since the microcontroller being programmed uses 12-bit instruction words). Each cycle is as long as four (4) periods of the programming clock. The frame begins with a sync cycle. During the entire sync cycle (i.e. for all four clock periods), the voltage on OSC2 is high. In contrast, for each command or data cycle, the voltage on OSC2 is driven low during the second clock period (period 1) of the cycle. [The voltage on OSC2 is still high during the first clock period (period 0) of the cycle.] Each command cycle corresponds to a bit transmitted from the programmer 610 to the microcontroller 604. Each data cycle corresponds to a bit transmitted either (a) from the programmer 610 to the microcontroller 604, or (b) from the microcontroller 604 to the programmer 610. During the third and fourth clock periods (periods 2 and 3), if the voltage on OSC2 is high, then the command or data cycle represents a logical 1. On the other hand, if the voltage on OSC2 is low during the third and fourth clock periods, then the command or data cycle represents a logical 0. Sampling is performed at the edge between the third and fourth clock periods of each command or data cycle in order to determine the logical value. In-system programming (ISP) commands for programming an EEPROM are known and can be utilized by one skilled in the pertinent art.

Figure 16:
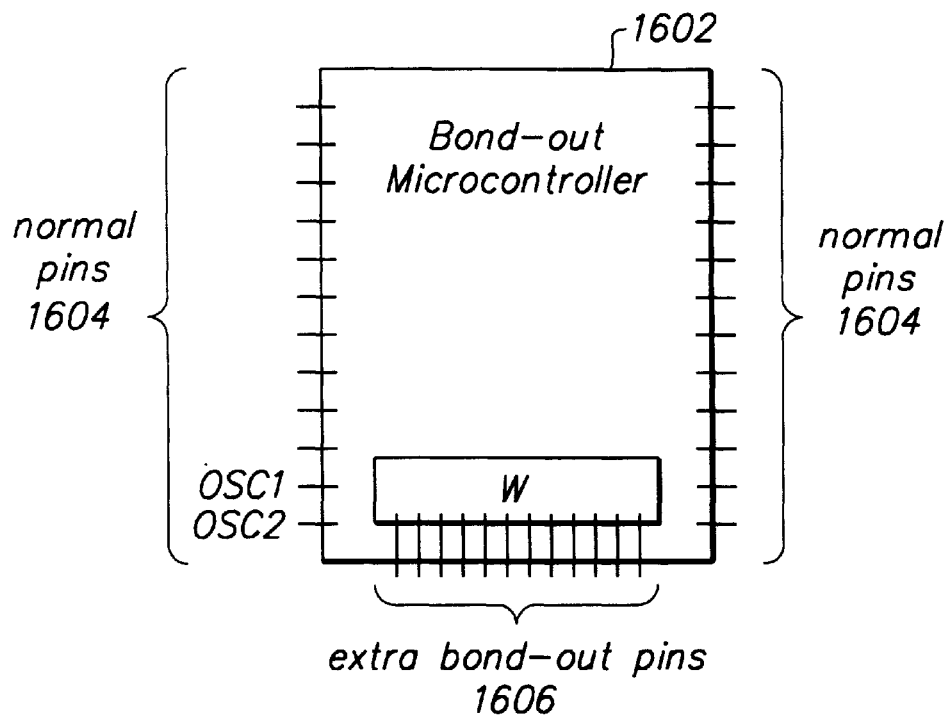
FIG. 16 is a diagram of a conventional bond-out microcontroller.

FIG. 16 is a diagram of a conventional bond-out microcontroller 1602. The bond-out microcontroller 1602 is a special version of the microcontroller adapted for use in an in-circuit emulation (ICE) system. The bond-out microcontroller 1602 includes both "normal" pins 1604 (i.e. those pins present in the production microcontroller) and extra "bond-out" pins 1606 that are bonded out from the data bus internal to the microcontroller 1602. In FIG. 16, the extra pins 1606 are shown as being coupled to contents of a working (W) register of the microprocessor 1602. (Note the apparent location of the pins on the perimeter of the chip in FIG. 16 has no functional significance; the fact being illustrated is that there are extra pins.)

Figure 17:
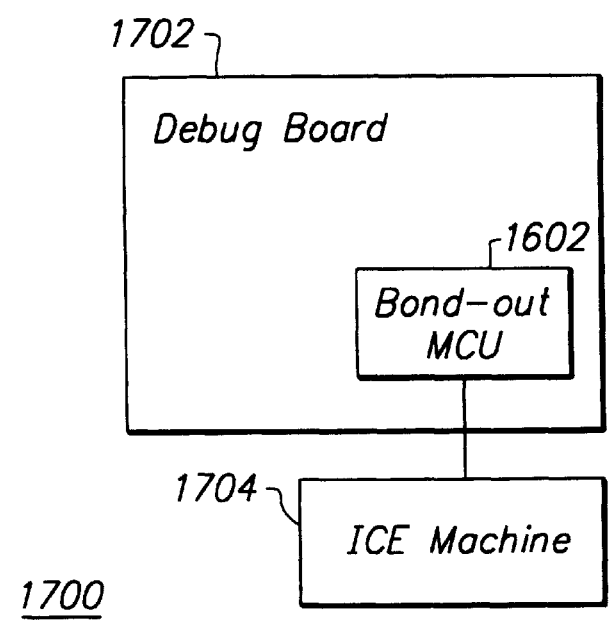
FIG. 17 is a diagram of a conventional in-circuit emulation (ICE) system.

FIG. 17 is a diagram of a conventional in-circuit emulation (ICE) system 1700. The ICE system 1700 includes a debug board 1702 and an ICE machine 1704. The debug board 1702 is a special version of the system board adapted for use in an ICE system 1700. The debug board 1702 includes the bond-out microcontroller 1602. The debug board 1702 is coupled to the ICE machine 1704 via the extra pins 1606 of the bond-out microcontroller 1602.

Figure 18:
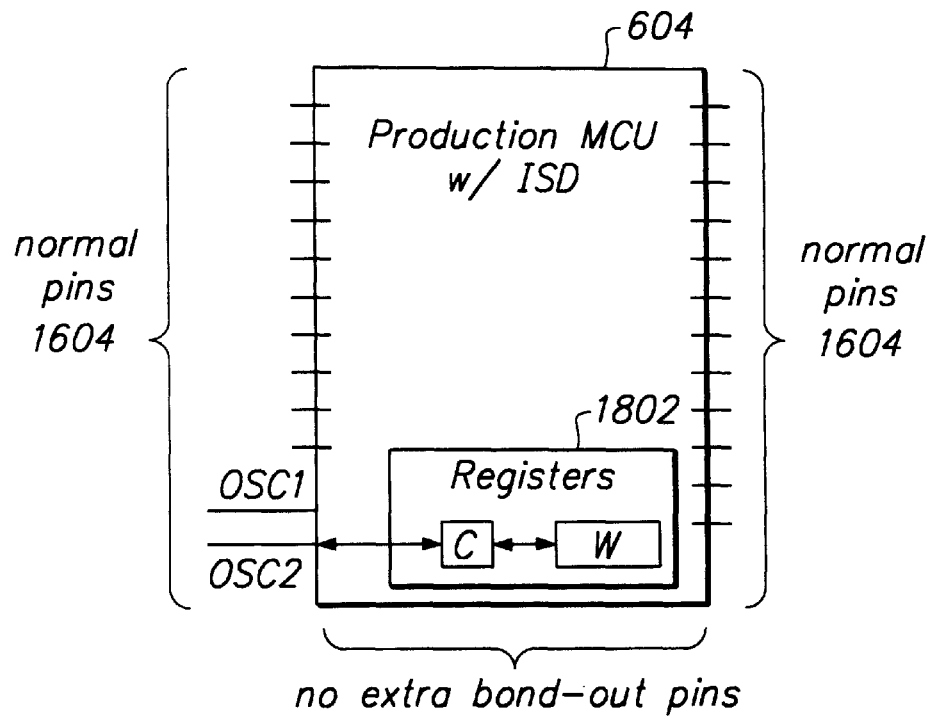
FIG. 18 is a diagram of a production microcontroller with an in-system debugging (ISD) capability according to a preferred embodiment of the present invention.

FIG. 18 is a diagram of a production microcontroller 604 with an in-system debugging (ISD) capability according to a preferred embodiment of the present invention. The microcontroller 604 includes the "normal" pins 1604, but does not need extra "bond-out" pins 1606. As shown in FIG. 18, two of the normal pins 1604 are oscillator pins (OSC1 and OSC2). The microcontroller 604 also includes registers 1802. As shown in FIG. 18, one of the registers 1802 is a working (W) register which is coupled to its carry (C) bit. The C bit is coupled to the OSC2 pin.

Figure 19:
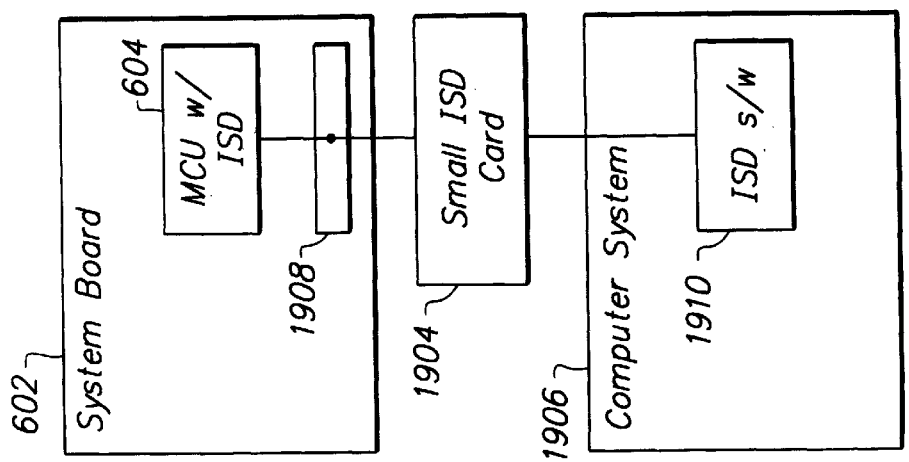
FIG. 19 is a diagram of an in-system debugging (ISD) system according to a preferred embodiment of the present invention.

FIG. 19 is a diagram of an in-system debugging (ISD) system 1900 according to a preferred embodiment of the present invention. The ISD system 1900 includes a system board 602, a small ISD card 1904, and a computer system 1906. The system board 602 includes the microcontroller 604 with an ISD capability and a connector 1908. The computer system 1906 may be a personal computer system and includes an ISD software (S/W) module 1910. The microcontroller 604 is coupled to the connector 1908. The connector 1908 is coupled to the small ISD card 1904, and the small ISD card 1904 is coupled to the computer system 1906.

Like the in-system programming (ISP) capability discussed above in relation to FIGS. 1–15, the ISD capability is implemented by way of the oscillator pins. In a preferred embodiment, data for debugging is communicated serially from the working (W) register to the ISD software 1910 via the carry (C) bit of the W register, the OSC2 pin, the small ISD card 1906, and the computer system 1906. The OSC2 pin is an open drain input/output with internal pull-up. The OSC1 pin is used to apply the programming voltage level (Vpp) necessary to program an EEPROM in the microcontroller 604. This apparatus and method for ISD is far less intrusive than, yet has capabilities similar to, conventional ICE systems 1700.

Figure 20:
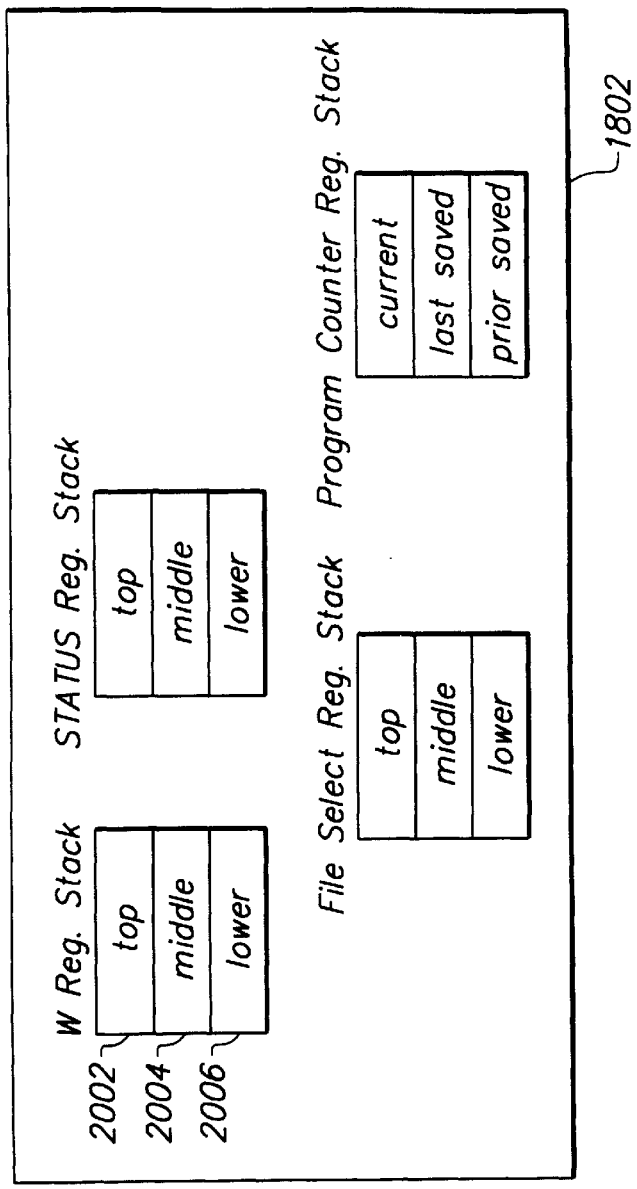
FIG. 20 is a diagram illustrating register stacks in the microcontroller according to a preferred embodiment of the present invention.

FIG. 20 is a diagram illustrating register stacks in the microcontroller 604 according to a preferred embodiment of the present invention. Four stacks are shown, including stacks for a working (W) register, a status register, a file select register, and a program counter (PC) register. The W register may also be known as an accumulator register which is well known in the art. The status register includes various status flags such as the carry/borrow flags, a zero flag, a power down bit, and a time-out bit. The file select register is a pointer for indirect addressing. The PC register indicates the location of the instruction currently being processed. Each of the above register stacks are three stack addresses high 2002, 2004, and 2006.

The top stack address 2002 is the register itself (e.g., the W register). The middle stack address 2004 contains the register contents last saved (i.e. by a push command). The lower stack address 2006 contains the register contents previously saved (i.e. by two push commands). Three stack addresses 2002, 2004, and 2006 are needed for each register stack because the state of the microcontroller 604 may need to be saved in two layers: first when a "normal" interrupts occurs, and second when a "debug" interrupt occurs. For example, consider the time before any interrupts when the top addresses 2002 of the above register stacks contain a "non-interrupt" state of the microcontroller 604. When a "normal" interrupt occurs, new values are pushed on top of each of the above register stacks, such that the top addresses 2002 contain the normal interrupt state of the microcontroller 604 and the middle addresses 2004 contain the non-interrupt state. Subsequently, if a "debug" interrupt occurs before the microcontroller 604 returns from the normal interrupt, then new values are again pushed on top of each of the above register stacks, such that the top addresses 2002 contain the debug interrupt state, the middle addresses contain the normal interrupt state, and the lower addresses contain the non-interrupt state.

Figure 21:
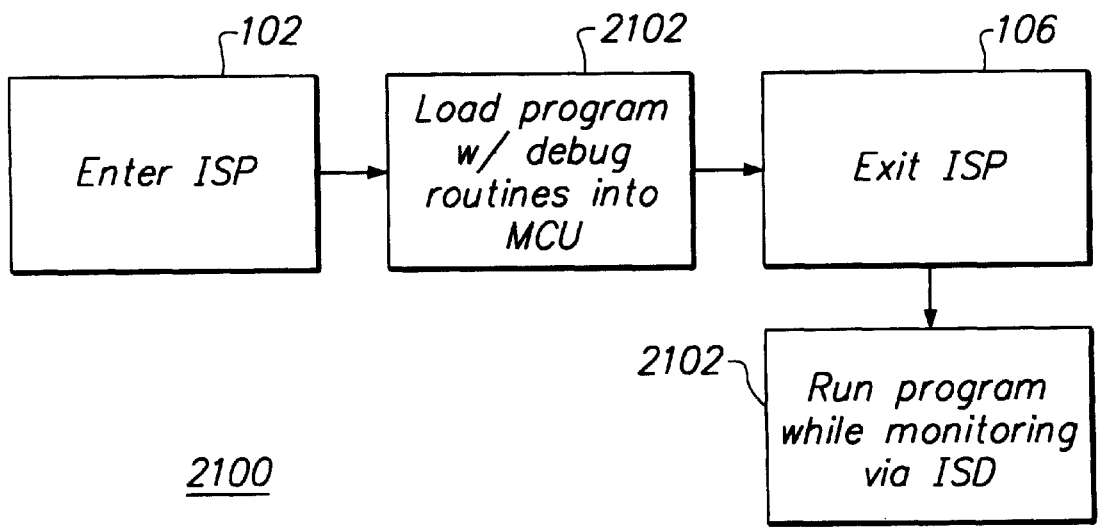
FIG. 21 is a flow diagram of a method for in-system debugging according to a preferred embodiment of the present invention.

FIG. 21 is a flow diagram of a method 2100 for in-system debugging according to a preferred embodiment of the present invention. The method 2100 includes entering 102 in-system programming (ISP) mode 102, loading 2102 (via ISP 106) the EEPROM 708 with a program to be debugged, exiting 106 the ISP mode, and running 2104 the program while monitoring its execution via the in-system debugging (ISD) system. Note that in a preferred embodiment, the apparatus for ISP and the apparatus for ISD are integrated together.

Regarding loading 2102 the program to be debugged, said program contains debug routines embedded therein, such as commands to add break points, to request single stepping, or to read registers. Regarding exiting 106 ISP mode, note that the microcontroller is reset at the end of the exiting 106.

During the running 2104 of the program, OSC1 and OSC2 are monitored. The ISD circuits inside the microcontroller 604 (internal ISD circuits) communicate to the ISD circuits outside the microcontroller 604 (external ISD circuits) by first driving and holding OSC2 low. In contrast, the normal behavior of OSC2 is either (a) OSC2 is the inverse of OSC1 (for XTAL mode), or (b) OSC2 is pulled high by an internal pull-up resistor (for XRC or IRC modes). Subsequently, the external ISD circuits disables the clock circuitry on the system board 602 and takes control over providing a clock to the microcontroller 604 over OSC1. The external ISD circuits can then shift out the register value serially over OSC2.

FIG. 22 gives datasheet descriptions of a new ISD register in the microcontroller 604 and new ISD instructions for the microcontroller 604 according to a preferred embodiment of the present invention. The new ISD register is labeled DEBUG. And the new ISD instructions include OPTIONR, DEBUG, OSC2RW, SETBP, FIFO PUSH_D, and POP_D. Given the datasheet descriptions in FIG. 22, understanding and using the above register and instructions is within the capabilities of one of ordinary skill in the pertinent art.

FIG. 23 is a listing of an example program including debug capabilities according to a preferred embodiment of the present invention. Instructions in the example program include "normal" microcontroller instructions and some of the new ISD instructions. The "normal" microcontroller instructions are described in various public documents, such as the book Easy PIC'n, by David Benson, published by Square 1 Electronics, 1996, said book is incorporated herein in its entirety. Creating such a program is within the capabilities of one of ordinary skill in the pertinent art.

When the example program is run 2104 (following a reset of the microcontroller 604), the first instruction executed is at address (hex) 7FF which instructs the microcontroller 604 to go to the instruction at address 040. The routine from 040 to 04B sets a break point at 0C. However, for the purposes of this example, assume that such a break point is not enabled (because the BRK_EN bit of the DEBUG register is high). Nevertheless, at the end of the routine (i.e. at 04B) the microcontroller 604 is instructed to return to user program at address 000. Here, for the purposes of this example, assume that single-stepping is enabled (because the SS_EN bit of the DEBUG register is low). Because single-stepping is enabled, at the end of each instruction in the user program, a debug interrupt is generated. When the debug interrupt is generated, the microcontroller 604 is instructed to execute the instruction at address 7FE. The instruction at 7FE instructs the microcontroller 604 to goto the instruction at 600, which is the first instruction of the debug interrupt service routine (debug ISR). At the end of the debug ISR, a "reti" instruction is used to exit the debug ISR. Control is then passed to the next instruction in the user program (e.g., the one at address 001).

The above description is included to illustrate the operation of preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An in-system debug (ISD) apparatus for debugging a program residing in a microcontroller of a microcontroller system, the apparatus comprising:
    a system board of the microcontroller system;
    a microcontroller having built-in ISI) hardware circuitry mounted on the system board having a pin that provides a first function during a normal mode of operation and a second data relay function during an internally controlled in-system debugging mode of operation for relaying data generated by the microcontroller responsive to executing the program to an external monitoring system without affecting the normal I/O operations of the microcontroller, and the external monitoring system, comprising:

an ISD interface board coupled to the system board for receiving the data generated by the microcontroller; and a computer system coupled to the ISD interface board, the computer system comprising an ISD software module for monitoring the data generated by the microcontroller.

2. The apparatus of claim 1, wherein the built-in ISD hardware is serially coupled to the pin to receive data relayed serially from the pin.

3. The apparatus of claim 2, wherein the ISD interface board is serially coupled to the pin to receive data relayed serially from the pin.

4. The apparatus of claim 3, wherein the pin functions as an oscillator pin during normal operation of the microcontroller.

5. The apparatus of claim 4, wherein the microcontroller further comprises a register which is serially coupled to the pin, the register being further coupled to the built-in ISD hardware.

6. The apparatus of claim 5, wherein the register comprises a working register (accumulator) during normal (non-programming and non-debugging) operation of the microcontroller.

7. The apparatus of claim 5, wherein the microcontroller further comprises a storage unit for a carry bit, and the storage unit is serially coupled between the pin and the register.

8. The apparatus of claim 1, wherein during normal operation, the system board is adapted to receive information from an external system and to control the external system using the information.

9. The apparatus of claim 8, wherein the microcontroller orchestrates the normal operation of the system board.

10. The apparatus of claim 1, further comprising an ISD software module in memory of the computer system for communicating with the built-in ISD hardware circuitry in the microcontroller.

11. The apparatus of claim 1, wherein the microcontroller further comprises a plurality of debug register stacks, each register stack having a corresponding debug register.

12. The apparatus of claim 11, wherein each register stack comprises a top stack address containing present contents of the corresponding register, a middle stack address containing most-recently-saved contents from the corresponding register, and a lower stack address containing next-to-most-recently-saved contents from the corresponding register.

13. The apparatus of claim 12, wherein for each register stack a normal (non-debug) interrupt causes contents from the top stack address of the corresponding register to be pushed to middle stack address of the corresponding register.

14. The apparatus of claim 13, wherein for each register stack a debug interrupt causes contents from the middle stack address of the corresponding register to be pushed to lower stack address of the corresponding register, and contents from the top stack address of the corresponding register to be pushed to middle stack address of the corresponding register.

15. The apparatus of claim 11, wherein the plurality of register stacks includes a register stack corresponding to a working register.

16. The apparatus of claim 11, wherein the plurality of register stacks includes register stacks corresponding to a working register, a status register, a file select register, and a program counter register.

17. A method for in-system debugging (ISD) of a program to be loaded into a microcontroller having built-in hardware circuitry, the microcontroller having a normal mode of operation, and an in-system programming (ISP) mode of operation, the method comprising:

entering an in-system programming (ISP) mode of the microcontroller, loading the program with embedded ISD commands into an EEPROM of the microcontroller;

exiting the ISP mode of the microcontroller; and executing the program in normal mode of operation while monitoring execution of the program by the microcontroller without affecting the normal I/O operations of the microcontroller, wherein monitoring the execution of the program is performed using an external monitoring system coupled to an ISD interface for receiving data generated by the microcontroller via a pin that provides a first function during a normal mode of operation and a second data relay function in an ISD mode of operation.

18. The method of claim 17, wherein the loading is performed serially.

19. The method of claim 17, wherein the debugging command comprises a command from a group of commands, said group including commands to add a breakpoint, request single-stepping, and read a register.

20. The method of claim 17, wherein the monitoring is performed via two pins adapted to function as oscillator pins during normal operation of the microcontroller.

* * * * *

UNITED STATES PATENT AND TRADEMARK OFFICE
CERTIFICATE OF CORRECTION

PATENT NO.    : 6,161,199

DATED         : December 12, 2000

INVENTOR(S)   : Kinyue Szeto, Charles M. Gracey, III, Chuck C.W. Cheng

It is certified that error appears in the above-identified patent and that said Letters Patent is hereby corrected as shown below:

On the cover sheet, delete the Title "Non-Intrusive In-System Debugging For a Microcontroller With In-System Programming Capabilities Using In-System Debugging Circuitry and Program Embedded In-System Debugging Commands" and insert --Non-Intrusive In-System Debugging for a Microcontroller With In-System Programming Capabilities Using In-System Debugging Circuitry--.

On the cover sheet, under References Cited, insert patent number --5,894,549--.

Column 10, line 58, delete "debug" and insert --debugging--.

Column 10, line 62, delete "ISI)" and insert --ISD--.

Column 11, line 3, after "microcontroller" delete "," and insert --;--.

Column 12, line 27, after "microcontroller" delete "," and insert --;--.

Signed and Sealed this

Twenty-ninth Day of May, 2001

*Attest:*

NICHOLAS P. GODICI

*Attesting Officer*     *Acting Director of the United States Patent and Trademark Office*